Figure 1:
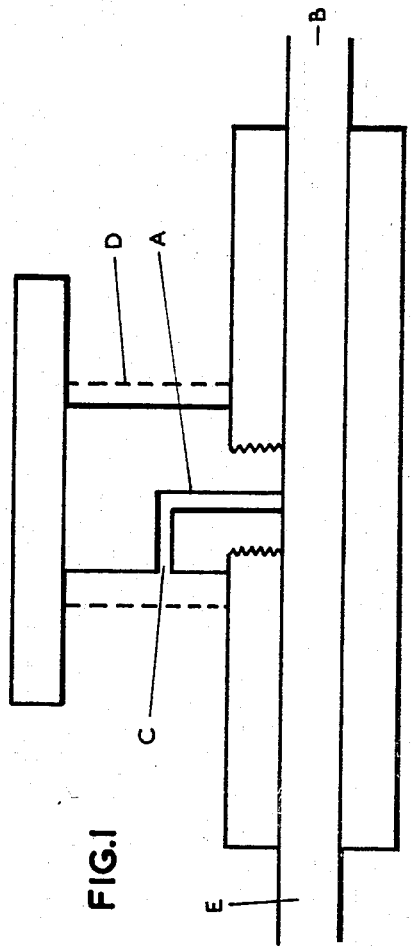

Oct. 4, 1966     T. B. PHILIP ETAL     3,276,841
DEFOULING UNDER-WATER STRUCTURES

Filed Jan. 23, 1962     2 Sheets-Sheet 1

Inventors,
Thomas Bruce Philip,
Peter Eric Scovell and
Peter Vincent Palmer
By Wenderoth Lind & Ponack
Attorneys 3,276,841
DEFOULING UNDER-WATER STRUCTURES
Thomas Bruce Philip, Effingham, Peter Eric Scovell, South Croydon, and Peter Vincent Palmer, London, England, assignors to The Distillers Company Limited, Edinburgh, Scotland, a British company
Filed Jan. 23, 1962, Ser. No. 168,152
Claims priority, application Great Britain, Feb. 4, 1961, 4,279/61, 4,280/61, 4,281/61
7 Claims. (Cl. 21—58)

This invention relates to a process for reducing the plant and/or animal growth which commonly forms on subaquatic structures and it is particularly suitable for reducing marine fouling which occurs on the hulls of ships. It also includes apparatus for carrying out said process.

The term plant and/or animal growth is used in this specification to include the bacteria and moulds which some authorities consider to be neither plants nor animals.

British patent specifications numbered 851,902, 852,882 and 852,268 describe some of the problems involved in reducing marine growth on structures such as ships' hulls which are immersed in water for long periods. These specifications disclose a number of liquid growth deterrents which are effective in combating this type of fouling.

An object of the present invention is to provide an improved method and apparatus for distributing liquid growth deterrents over subaquatic structure such as the external underwater surfaces of the hulls of vessels.

Accordingly the present invention is a process for distributing liquid growth deterrent over an underwater surface which comprises intermittently injecting liquid growth deterrent under pressure into a perforated pipe system so that the deterrent is ejected from perforations in the pipe system, and thereafter contacts the underwater surface, said pipe system having a non-return valve associated with each perforation. The invention also consists in apparatus for carrying out this process which is suitable for attachment to the underwater surface.

Any liquid growth deterrent can be used which is capable of inhibiting or removing the growth of or caused by aquatic plants and/or animals. Compounds can be dissolved or dispersed in liquid carriers to provide liquid deterrents. Examples of suitable deterrents are solutions in liquid paraffin hydrocarbons of compounds mentioned in British patent specifications numbered 851,902 and 852,882. The preferred liquid growth deterrents are kerosene and light diesel oils which are readily available.

The perforated pipe system, by means of which the liquid growth deterrent is distributed over the underwater surface can consist of a single pipe or a plurality of pipes. It is preferably attached to the subaquatic structure. A system consisting of a number of pipes can be attached externally to the underwater surface of the hull of a ship, preferably running along the length of the ship in the region of the keel or bilge keels. The pipes can suitably be made of any material which does not react with the liquid deterrent, or corrode in the surrounding water. Pipe systems of this type frequently consist of metals or alloys which differ from the metal forming the underwater surface to which they are attached. The use of such metals tends to induce and enhance electrolytic corrosion of the underwater surface and also of the pipes since an electrolytic cell is set up between the metals and water. This trouble can be minimised by coating at least the external surfaces of the pipes with a plastic material. Examples of suitable plastics are polyethylene, polyvinyl chloride and neoprene. A suitable thickness for such plastic coatings is approximately 1/16 of an inch.

The bore size of the pipe or pipes can vary widely and is governed by a number of factors such as the pressure at which the liquid deterrent is injected into the pipe system. Preferably the bore size is so chosen that operation of the process according to the invention results in liquid deterrent being ejected from all perforations in the pipe system in the desired quantities. A suitable bore diameter for pipe systems used in defouling ships' hulls is from 1/4 to 3/4 of an inch.

The perforations are situated at a sufficient frequency along the length of the pipe to ensure adequate distribution of liquid deterrent over the underwater surface. When the invention is applied to ships a suitable interval between each perforation is from 5 to 30 feet and it is preferred that they should be arranged along the upper surface of the pipe, i.e., the underwater surface nearest to the hull.

Each perforation can be a hole in the pipe wall with sufficient size of orifice to allow the ejection of a desired quantity of liquid growth deterrent, and is associated with a non-return valve which allows the liquid deterrent inside the pipe to leave the system, but prevents entry into the pipe of liquid from outside the system. Where, for example, such a pipe system is fitted to the hull of a ship these valves prevent the water in which the ship floats from entering the pipes. The valves also facilitate the ejection of approximately equal amounts of liquid growth deterrent from each perforation.

The rate at which liquid growth deterrent is ejected from the perforated pipe system can be controlled by the size of either the perforations or the exit hole in each valve which is associated with the perforation.

Liquid growth deterrent is preferably injected into the pipe system according to the present invention by a device capable of delivering a specific amount of deterrent at predetermined intervals, so that deterrent is ejected from all perforations of the pipe system. A suitable device can consist of a reservoir, containing the liquid growth deterrent maintained at a pressure greater than the pressure existing in the pipe system, which is connected with the reservoir and having a valve interposed between the reservoir and the pipe system. The valves can be controlled for example by an electrically operated switch, so as to open intermittently at predetermined intervals, thus intermittently injecting a quantity of liquid deterrent into the pipe system.

The distribution of the liquid growth deterrent over the underwater surface can be assisted by supplying a gas to the underwater surface independently of the liquid growth deterrent. The preferred gas is air.

The gas can be supplied independently in perforated pipes arranged on the underwater surfaces of the structures in such a manner that a pipe supplying only the liquid growth deterrent runs in juxta-position to another pipe which supplies only the gas. In particular, when the pipes are attached externally to the underwater surface of the hull of a ship, they can be arranged so that the pipe or pipes supplying liquid deterrent and the pipe or pipes supplying gas run parallel to each other along the length of the ship in the region of the keel or bilge keels. Most suitably, the pipe supplying liquid and the pipe supplying gas should be arranged to run side by side at a distance of not more than 2 feet from each other. However, it is not essential to place the pipe systems supplying liquid deterrent in close proximity to the pipe system supplying gas. In fact it is often desirable to arrange the pipes in such a manner that gas is supplied only to particular areas of an underwater surface to which liquid deterrent is generally applied.

The bore size of the pipe or pipes supplying the gas can vary widely and is influenced by a number of factors but principally by the pressure at which the gas is supplied to the pipe system. With any given set of conditions a bore size is considered suitable when by operation of the process gas is ejected from all perforations. When the apparatus is applied to the underwater surfaces of ships' hulls the preferred internal diameter of the pipe is from ½ inch to 2 inches.

The perforations are situated at a sufficient frequency along the length of the pipe to ensure adequate distribution of gas over the underwater surface of the subaquatic structure. When applied to ships a suitable interval between each perforation is from 5 to 30 feet. It is preferred that the perforations should be arranged along the upper surface of the pipe i.e. the underwater surface nearest to the hull. The exit of each perforation in the pipe or pipe system supplying gas can simply be a hole, preferably with a diameter of 1/16 to 3/8 of an inch. However, the exit of each perforation can be associated with a non-return valve of the type hereinbefore described for use in pipe systems carrying liquid growth deterrent.

Gas can be injected into the pipe system by any device which gives sufficient pressure to eject some gas from perforations along the length of the pipe. The preferred pressure is that which causes gas to be ejected from each perforation at a rate of between 1/10 to 1 cubic foot/minute.

Figure 2:
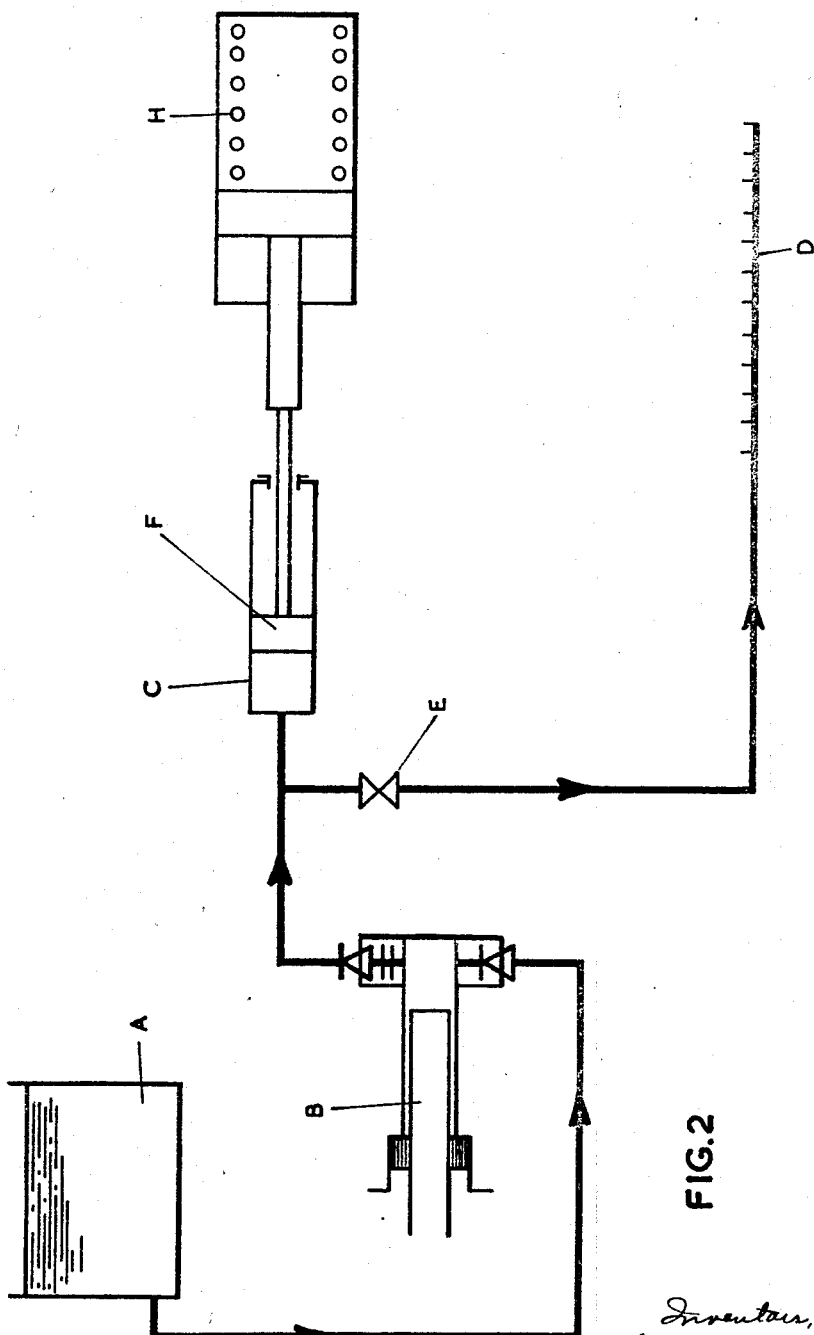

The accompanying drawings further illustrate the invention. FIGURE 1 shows a valve suitable for use in association with each perforation in the pipe system and FIGURE 2 shows an apparatus suitable for distributing liquid growth deterrent. The valves embody the principle and are adaptations of the valve commonly used for preventing the exit of air from the pneumatic tire of a bicycle. FIGURE 1, shows a section of such a valve which has a hollow internal cavity or tube A connected to a cavity B described by the internal bore of the pipe system E. A hole or jet C in the external surface of the valve is covered by a flexible sleeve D which can suitably be made of a synthetic rubber such as neoprene. When the valve operates liquid deterrent can pass from the pipe system through the exit hole C and the flexible sleeve D prevents liquid from flowing back into the system. The rate of ejection of deterrent from the pipe system can be controlled by the bore size of the exit hole C. The resilience of the flexible sleeve D is such that it has little influence on the rate of ejection and it simply prevents return flow.

In FIGURE 2 the reservoir A from which the deterrent can be pumped by a metering pump B into a second reservoir C which is connected with the pipe system D, through the valve E. The deterrent in the second reservoir C is under pressure from the plunger F which is actuated by spring H and is discharged into the pipe system D on reaching capacity by the automatic opening of valve E when the liquid deterrent in reservoir C reaches a predetermined volume. Suction and discharge valves on the metering pump prevent the flow of deterrent back into reservoir A.

The process of the present invention is further illustrated by the following example.

*Example*

A 300 ft. length of pipe with a bore size of approximately 5/16 of an inch having 16 perforations along its length with a non-return valve associated with each perforation was connected by one end to a pumping unit. The perforations were numbered in ascending order, the lowest number nearest the pumping unit. Perforations 1 to 5 were spaced at 30 ft. intervals, 6 to 10 at 20 ft. intervals and 10 to 16 at 10 ft. intervals. The pumping unit discharged ½ a gallon per hour of kerosene, into the pipe system. This discharge was accomplished by intermittently injecting the liquid into the pipe for periods of two seconds and at intervals of about 30 seconds between each injection. In order to simulate for example the conditions present at an underwater surface a ship's hull with a variation in fore and aft trim of four feet, a column of water approximately 8 feet high was placed over each perforation in the pipe, the columns varying along the 300 foot length of pipe by a height of four feet. The perforations were numbered, commencing nearest the pumping unit. The volume discharged from each perforation per hour is given in the table.

By way of comparison the discharge given by the same pumping unit and pipe system with the non-return valves removed, was heavy through perforations 1, 2 and 3. The discharge then diminished rapidly up to perforation number 10 where it practically ceased.

| Perforation No. | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Volume of liquid per hour (in ccs.) | 237 | 207 | 179 | 185 | 76 | 152 | 125 | 109 | 130 | 109 | 120 | 136 | 103 | 125 | 125 | 141 |

We claim:

1. A method for evenly distributing liquid growth deterrent over a surface encompassed by water which comprises intermittently ejecting said liquid growth deterrent as a plurality of streams, alternately increasing and decreasing propellant pressure on said liquid growth deterrent, the magnitude of the greatest propellant pressure on said liquid growth deterrent being greater than backward pressure of the water and the magnitude of the lowest propellant pressure on said liquid growth deterrent being lower than the backward pressure of the water and, when said propellant pressure on said liquid deterrent is less than said backward pressure of the water, discontinuing contact between said water and said liquid growth deterrent at the point of ejection of each stream whereby the effect of backward pressure of water on said liquid growth deterrent is neutralized.

2. A process as claimed in claim 1 wherein the distribution of the liquid growth deterrent over the surface encompassed by water is assisted by supplying a gas to said surface independently of the liquid growth deterrent.

3. A process as claimed in claim 2 wherein the gas is ejected from each perforation of a perforated pipe system at a rate in the range of 1/10 to 1 cubic foot per minute.

4. An apparatus for distributing liquid growth deterrent which is suitable for attachment to an underwater surface comprising a perforated pipe system having a plurality of orifices, each orifice having a non-return valve connected thereto, whereby water is prevented from entering each of said orifices, and means for alternately increasing the forward pressure of said liquid in said system to a magnitude greater than the backward pressure of the water and decreasing said forward pressure of said liquid to a magnitude lower than the backward pressure of the water whereby the liquid flows out of said perforated pipe system when the forward pressure of said liquid is greater than the backward pressure of the water.

5. An apparatus as claimed in claim 4 wherein at least the external surfaces of the pipe system are coated with a plastic material.

6. An apparatus as claimed in claim 4 in association with a separate pipe system for supplying gas to the underwater surface.

7. An apparatus as claimed in claim 6 wherein the diameter of each perforation in the pipe system carrying liquid deterrent is in the range 0.01 to 0.05 of an inch and the diameter of each perforation in the pipe system carrying gas is in the range 1/16 to 1/8 of an inch.

References Cited by the Examiner

UNITED STATES PATENTS

| | | |
|---|---|---|
| 558,671 | 4/1896 | Bruner. |
| 559,928 | 5/1896 | Buergermeister _____ 114—233 |
| 725,137 | 4/1903 | Quanonne. |
| 917,935 | 4/1909 | Elniff. |
| 1,445,839 | 2/1923 | Mahoney. |
| 1,587,597 | 6/1926 | MacLellan _____ 222—340 |
| 2,138,831 | 12/1938 | Brammer. |
| 2,290,363 | 7/1942 | Stirton _____ 222—341 X |
| 2,330,164 | 9/1943 | Wiedenhoefer _____ 210—64 X |
| 2,545,319 | 3/1951 | Sundholm _____ 222—340 X |
| 2,572,540 | 10/1951 | Thompson _____ 222/340 X |

FOREIGN PATENTS 22,121  10/1936  Australia.

MORRIS O. WOLK, *Primary Examiner.*

E. SZOKE, J. ZATARGA, *Assistant Examiners.*